United States Patent
Matsuhisa et al.

(10) Patent No.: US 10,511,209 B2
(45) Date of Patent: Dec. 17, 2019

(54) ENGINE GENERATOR

(71) Applicant: Honda Motor Co., Ltd., Tokyo (JP)

(72) Inventors: Tetsuya Matsuhisa, Wako (JP); Kenji Shibata, Wako (JP); Wataru Matsuyama, Wako (JP); Minoru Maedako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/936,368

(22) Filed: Mar. 26, 2018

(65) Prior Publication Data
US 2018/0287460 A1 Oct. 4, 2018

(30) Foreign Application Priority Data
Mar. 30, 2017 (JP) .................................. 2017-066547

(51) Int. Cl.
| H02K 7/00 | (2006.01) |
| H02K 7/18 | (2006.01) |
| H02K 11/04 | (2016.01) |
| H02K 11/00 | (2016.01) |
| H02K 7/20 | (2006.01) |

(52) U.S. Cl.
CPC ............. H02K 7/1815 (2013.01); H02K 7/20 (2013.01); H02K 11/0094 (2013.01); H02K 11/048 (2013.01)

(58) Field of Classification Search
CPC ..... H02K 7/20; H02K 7/1815; H02K 11/0094
USPC ......... 290/1 A; 439/500, 504; 322/10; 123/2
See application file for complete search history.

(56) References Cited

U.S. PATENT DOCUMENTS

| 5,251,329 A * | 10/1993 | Takagi | H04M 1/0262 379/440 |
| 6,839,510 B2 * | 1/2005 | Kameyama | G03B 15/05 396/176 |
| 6,844,707 B1 * | 1/2005 | Raad | F02N 11/04 290/46 |
| 7,309,928 B2 * | 12/2007 | Grant | F02D 29/06 290/1 A |
| 7,543,793 B2 * | 6/2009 | Graham | F16M 1/00 248/639 |
| 7,549,892 B2 * | 6/2009 | Sawyers | H01R 13/04 439/500 |
| 7,687,926 B2 * | 3/2010 | Grant | F02B 63/04 290/1 A |
| 7,782,626 B2 * | 8/2010 | Buck | H01M 2/1083 361/747 |
| 7,989,969 B2 * | 8/2011 | Grant | F02B 63/04 290/1 A |

(Continued)

FOREIGN PATENT DOCUMENTS

| JP | 2012244690A A | 12/2012 |
| JP | 2014181567 A | 9/2014 |

*Primary Examiner* — Julio C. Gonzalez
(74) *Attorney, Agent, or Firm* — Duft & Bornsen, PC (57) ABSTRACT

An engine generator, including a general-purpose engine, a generator unit driven by the engine to generate electric power and capable of operating as an engine starter motor during engine starting, a case housing the engine and the generator unit, a battery detachably attached to the case, an inverter unit connected to the generator unit, and a power supply circuit interconnecting the battery attached to the case and the inverter unit and supplying power of the battery through the inverter unit to the generator unit.

11 Claims, 6 Drawing Sheets

(56) References Cited

U.S. PATENT DOCUMENTS

| | | | | |
|---|---|---|---|---|
| 8,319,357 B2* | 11/2012 | Usselman | ............... | F02B 63/04 290/1 A |
| 2003/0114203 A1* | 6/2003 | Lee | ................... | H01R 13/2421 455/572 |
| 2004/0178637 A1* | 9/2004 | Eguchi | ................. | H02J 7/1438 290/40 F |
| 2005/0173985 A1* | 8/2005 | Eguchi | ................. | H02J 7/1415 307/10.1 |
| 2007/0270194 A1* | 11/2007 | Park | ................... | H04M 1/0262 455/575.1 |
| 2010/0060015 A1* | 3/2010 | Buker | ................... | F02B 63/04 290/1 R |
| 2011/0095540 A1* | 4/2011 | Jackson | ................. | F02B 63/04 290/1 A |
| 2014/0342213 A1* | 11/2014 | Ebisawa | .............. | H01R 9/2408 429/121 |
| 2017/0244302 A1* | 8/2017 | Yakeno | ................... | F02B 61/04 |
| 2017/0263394 A1* | 9/2017 | Higuchi | ................... | H05K 5/03 |

* cited by examiner

ENGINE GENERATOR

CROSS-REFERENCE TO RELATED APPLICATION

This application is based upon and claims the benefit of priority from Japanese Patent Application No. 2017-066547 filed on Mar. 30, 2017, the content of which is incorporated herein by reference.

BACKGROUND OF THE INVENTION

Field of the Invention

This invention relates to an engine generator including a generator unit driven by a general-purpose engine.

Description of the Related Art

Generators are known that have a recoil starter for engine starting that is connected to the engine's crankshaft and can be operated to rotate the crankshaft and start the engine. A generator of this type is described in JP2014-181567A, for example. However, starting an engine by operating a coil starter in the manner required by the generator set out in JP2014-181567A requires considerable exertion by the user and places a heavy burden on the user. In contrast, generators are known that have a built-in battery and perform engine starting by cranking the engine using a generator unit (alternator) as a starter motor powered by the battery. A generator of this type is described in JP2012-244690A, for example.

However, the generator according to JP2012-244690A is enlarged by the need for the built-in battery.

SUMMARY OF THE INVENTION

An aspect of the present invention is an engine generator, including: a general-purpose engine; a generator unit configured to be driven by the engine to generate electric power and to be able to operate as an engine starter motor during engine starting; a case configured to house the engine and the generator unit; a battery configured to be detachably attached to the case; an inverter unit configured to be connected to the generator unit; and a power supply circuit configured to interconnect the battery attached to the case and the inverter unit and to supply power of the battery through the inverter unit to the generator unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
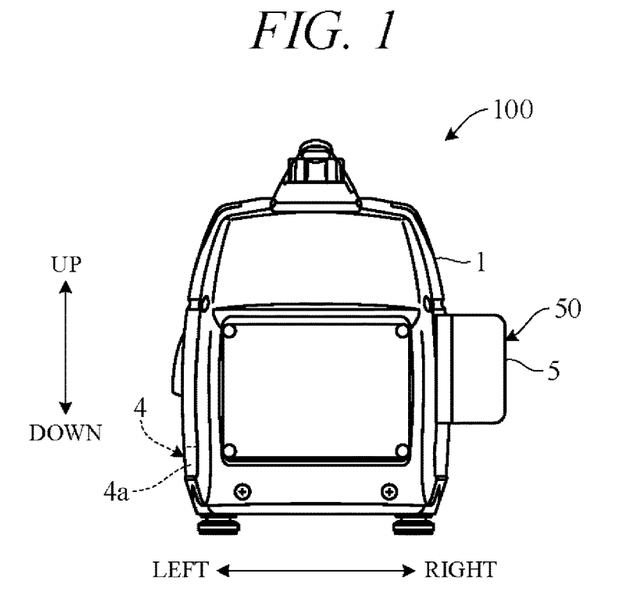
FIG. 1 is a front view of an engine-generator according to an embodiment of the present invention.
Figure 2:
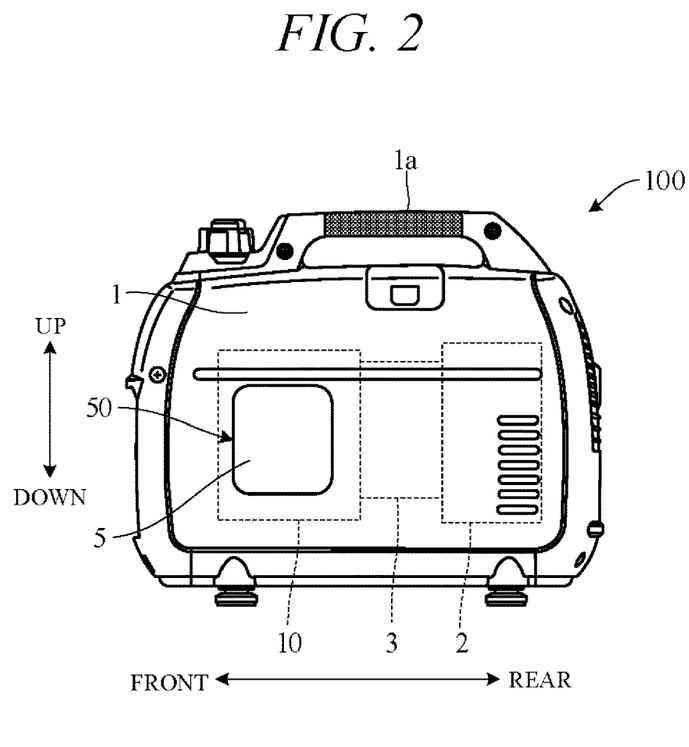
FIG. 2 is a side view of the engine-generator according to an embodiment of the present invention.

There now follows an explanation of an embodiment of the present invention with reference to FIGS. 1 to 7. FIGS. 1 and 2 are respectively a front view and a side view of an engine-generator 100 according to an embodiment of the present invention. In the following, for convenience of explanation, front-rear direction, left-right (lateral) direction and up-down (vertical) direction are defined as indicated in the drawings, and configuration of components is explained using this definition. Up-down direction corresponds to gravitational direction.

As shown in FIGS. 1 and 2, the engine-generator 100 has a case 1 with an overall box-like shape having front and rear faces, left and right faces, and top and bottom faces. The case 1 houses a general-purpose engine 2, a generator unit 3 driven by the engine 2, and an inverter unit 10 connected to the generator unit 3. The engine-generator 100 is a portable or mobile electric machine of weight and size a user can carry by hand, and a carry handle 1a is provided on the top of the case 1 for easy carrying.

The engine 2 is, for example, a spark ignition, air cooled, gasoline fueled engine with a piston that reciprocates inside a cylinder and a crankshaft (output shaft) that rotates synchronously with the piston. The crankshaft extends in the front-rear direction, for example, and motive power of the engine 2 is output through the crankshaft to the generator unit 3. The crankshaft is connected to a recoil starter 4.

The recoil starter 4 constitutes an engine starting device that the user uses to start the engine 2 manually. The recoil starter 4 has a cable wound on a pulley (not shown) and a knob 4a fixed to the distal end of the cable. The knob 4a is, for example, provided on the left face of the case 1, and the pulley rotates when the user grasps the knob 4a and pulls the cable. As this rotation of the pulley rotates the crankshaft, it can start the engine 2.

The generator unit (generator main unit) 3 is a multipolar alternator driven by the engine 2 to generate AC power. It includes a rotor connected to and rotated integrally with the crankshaft and a stator arranged concentric with the rotor to face a peripheral surface thereof. The rotor is provided with permanent magnets. The stator is provided with UVW windings arranged at phase angle differences of 120 degree.

As a characterizing feature, the engine-generator 100 of the present embodiment includes a battery pack 50 with built-in battery 5 removably mounted on the right face of the case 1. The battery 5 is connected through the inverter unit 10 to the generator unit 3, whereby the generator unit 3 can be driven as a starter motor for starting the engine 2 by power from the battery 5. In other words, the generator unit 3 can not only generate electricity but can also function as a starter-generator for starting the engine 2. The battery 5 is a rechargeable (secondary) battery that applies predetermined voltage for starting the engine 2, and can be a lithium-ion battery, for example.

Figure 3:
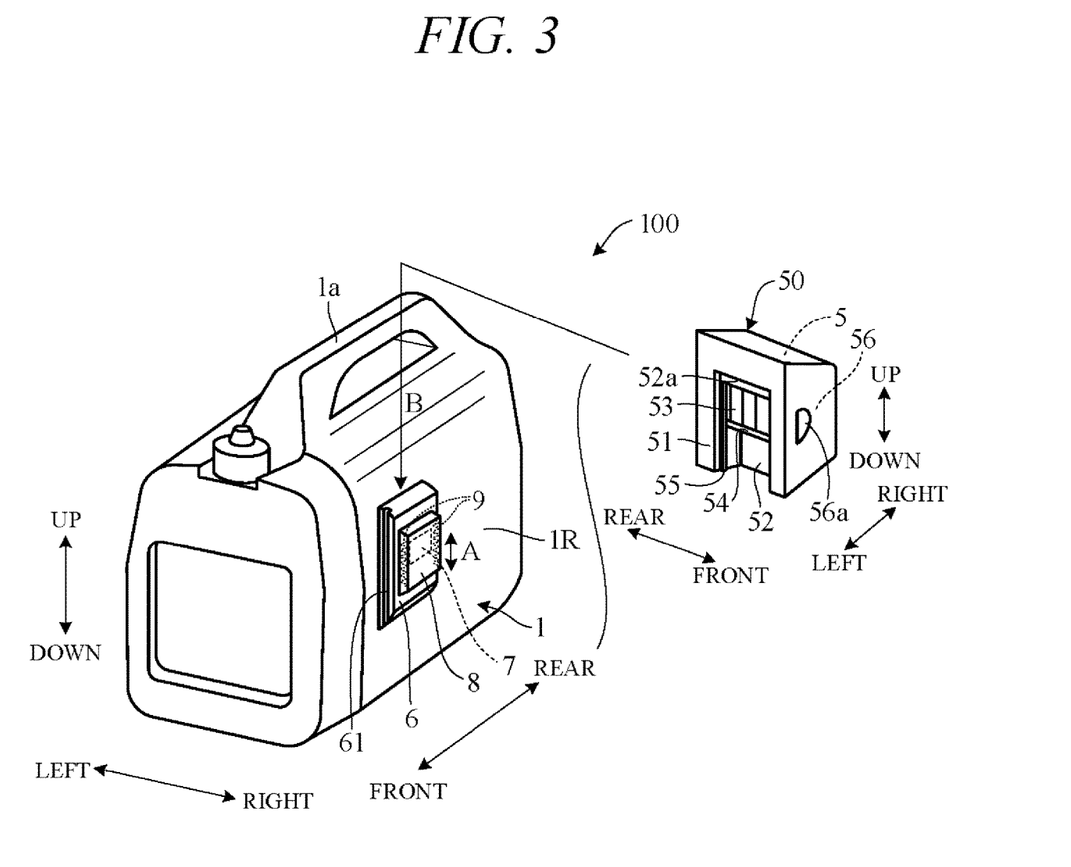
FIG. 3 is a perspective view showing a battery pack as removed from the engine-generator according to an embodiment of the present invention.

FIG. 3 is an overall perspective view of the engine-generator showing the battery pack 50 as removed. As shown in FIG. 3, a rectangular plate-like terminal block 6 is attached to right face 1R of the case 1, and terminals (contacts) 7 connected to the inverter unit 10 are provided on the surface (right face) of the terminal block 6. The terminals 7 are covered by a cover 8 slidable vertically (in arrow A direction).

A pair of springs 9 is provided inside the cover 8 (between the terminal block 6 and the cover 8), one on the front side and the other on the rear side of the terminals 7, for example. One end of each spring 9 is fastened to the terminal block 6 and another end thereof is fastened to a lower end of the cover 8. The cover 8 is therefore biased upward by the springs 9 and retained at the initial position of FIG. 3, i.e., at the upper end position. When the cover 8 is slid downward against the biasing force of the springs 9, the terminals 7 are exposed. The front and rear faces of the terminal block 6 are formed with vertically extending grooves 61.

The battery pack 50 exhibits an overall box-like shape having front and rear faces, left and right faces, and top and bottom faces. A left face 51 of the battery pack is a battery pack attachment surface destined to face the terminal block 6, and this attachment surface (left face 51) is provided with a recess 52 closed in the lateral and upward directions and open in the downward direction. Terminals (contacts) 53 of the battery 5 are provided to be exposed on a floor of the recess 52. A leftward protruding projection 54 is formed below the terminals 53. An upper face 52a of the recess 52, which resembles a step, constitutes a stop for regulating sliding position of the battery pack 50 with respect to the terminal block 6.

Width (front-rear length) of the recess 52 is substantially equal to width of the terminal block 6, and protuberances 55 are formed to extend vertically on the front and rear faces of the recess 52 congruently with the grooves 61 of the terminal block 6. The battery pack 50 can be attached to the terminal block 6 by sliding the battery pack 50 along the terminal block 6 from above, as indicated by arrow B in FIG. 3, while engaging the front and rear protuberances 55 with the front and rear grooves 61. Although not shown in the drawings, the battery pack 50 is provided with a latch mechanism for preventing the battery pack 50 from rising upward and falling off owing to engine vibration, and by operating the latch mechanism, movement of the battery pack 50 can be prevented to maintain the battery pack 50 in the attached condition. The latch mechanism can be released to enable removal of the battery pack 50 by operating latch release buttons 56a provided on the front and rear faces of the battery pack 50.

Figure 4A:
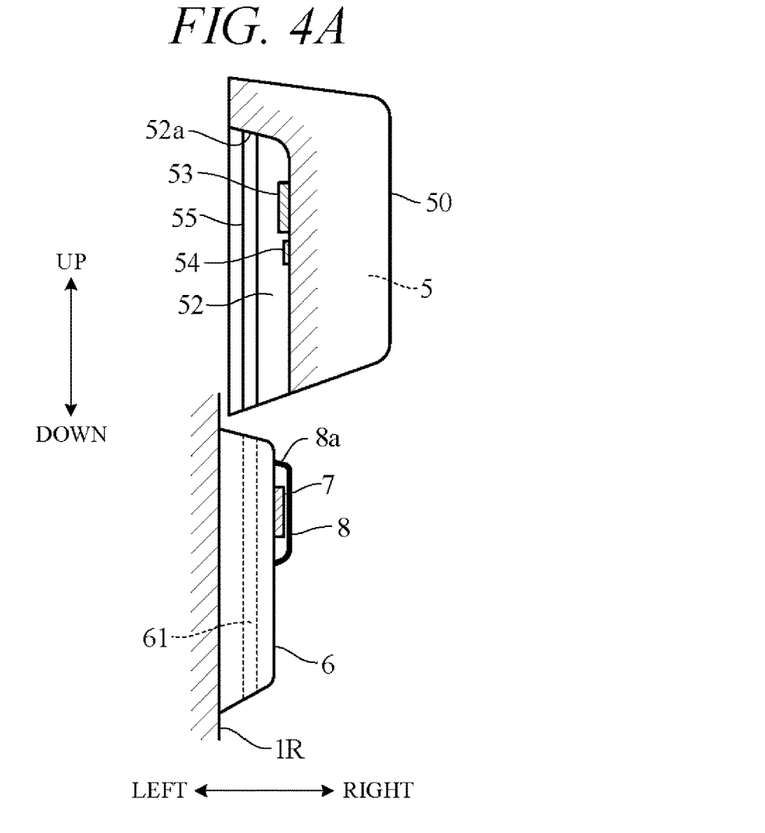
FIG. 4A is a diagram illustrating how the battery pack of the engine-generator according to an embodiment of the present invention is attached.
Figure 4B:
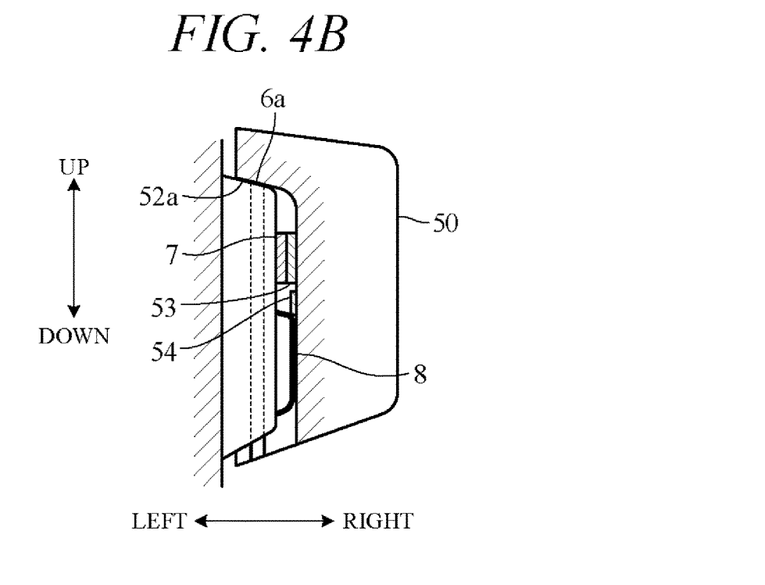
FIG. 4B is a diagram showing an example of an operation following the operation of FIG. 4A.

FIGS. 4A and 4B are diagrams (partially sectional diagrams) illustrating how the battery pack 50 of the engine-generator 100 according to the present embodiment is attached. When the battery pack 50 is to be attached, it is positioned (held) above the terminal block 6, as shown in FIG. 4A, and once the front and rear grooves 61 of the terminal block 6 and the front and rear protuberances 55 of the battery pack 50 are brought into engagement, the battery pack 50 is slid downward while controlling the font-rear direction and lateral direction positions of the battery pack 50 with respect to the terminal block 6. After the projection 54 of the battery pack 50 abuts on an upper face 8a of the cover 8, it pushes the cover 8 downward against the biasing force of the springs 9 (FIG. 3).

As shown in FIG. 4B, the battery pack 50 is slid fully downward until the upper face 52a of the recess 52 abuts on an upper face 6a of the terminal block 6. At this time, the cover 8 is pushed to the bottommost position, thereby exposing the terminals 7 of the terminal block 6, and the terminals 7 and the terminals 53 of the battery 5 make contact. More exactly speaking, the right faces of the terminals 7 come into contact with the left faces of the terminals 53. As a result, power can be supplied from the battery 5 through the inverter unit 10 to the generator unit 3. The so-attached battery pack 50 can be detached (removed) from the terminal block 6 by sliding the battery pack 50 upward while operating the release buttons 56a. During the removal, the cover 8 moves upward under the biasing force of the springs 9 and covers the terminals 7.

Owing to the removable attachment of the battery 5 (battery pack 50) to a side face (right face 1R) of the case 1 in the aforesaid manner, power for driving the generator unit 3 as a motor starter during engine starting can be supplied from the battery 5. Therefore, as the battery 5 need not be installed inside the case 1, the engine-generator 100 can be compactly configured and an engine-generator 100 excellent in portability and mobility can be provided. In particular, a configuration can be realized that enables the battery 5 to be attached by an easy operation (simple sliding operation) only at engine starting, and since the battery 5 can therefore be removed when the engine-generator 100 is to be moved, the size and weight of the engine-generator 100 can be reduced in proportion.

Moreover, the operation for removing the battery 5 (upward sliding operation) results in the terminals 7 being automatically covered by the cover 8, so that exposure of the terminals 7 to the exterior can be prevented to ensure protection of the surfaces of the terminals 7. In addition, the battery pack 50 is slid to its bottommost position with the protuberances 55 of the battery pack 50 engaged in the grooves 61 of the terminal block 6, whereby the terminals 7 and 53 contact each other in a state with the battery pack 50 positionally aligned with the terminal block 6. The battery pack 50 can therefore be stably restrained at a predetermined contact position even when subject to vibration of the engine 2 or the like.

Figure 5:
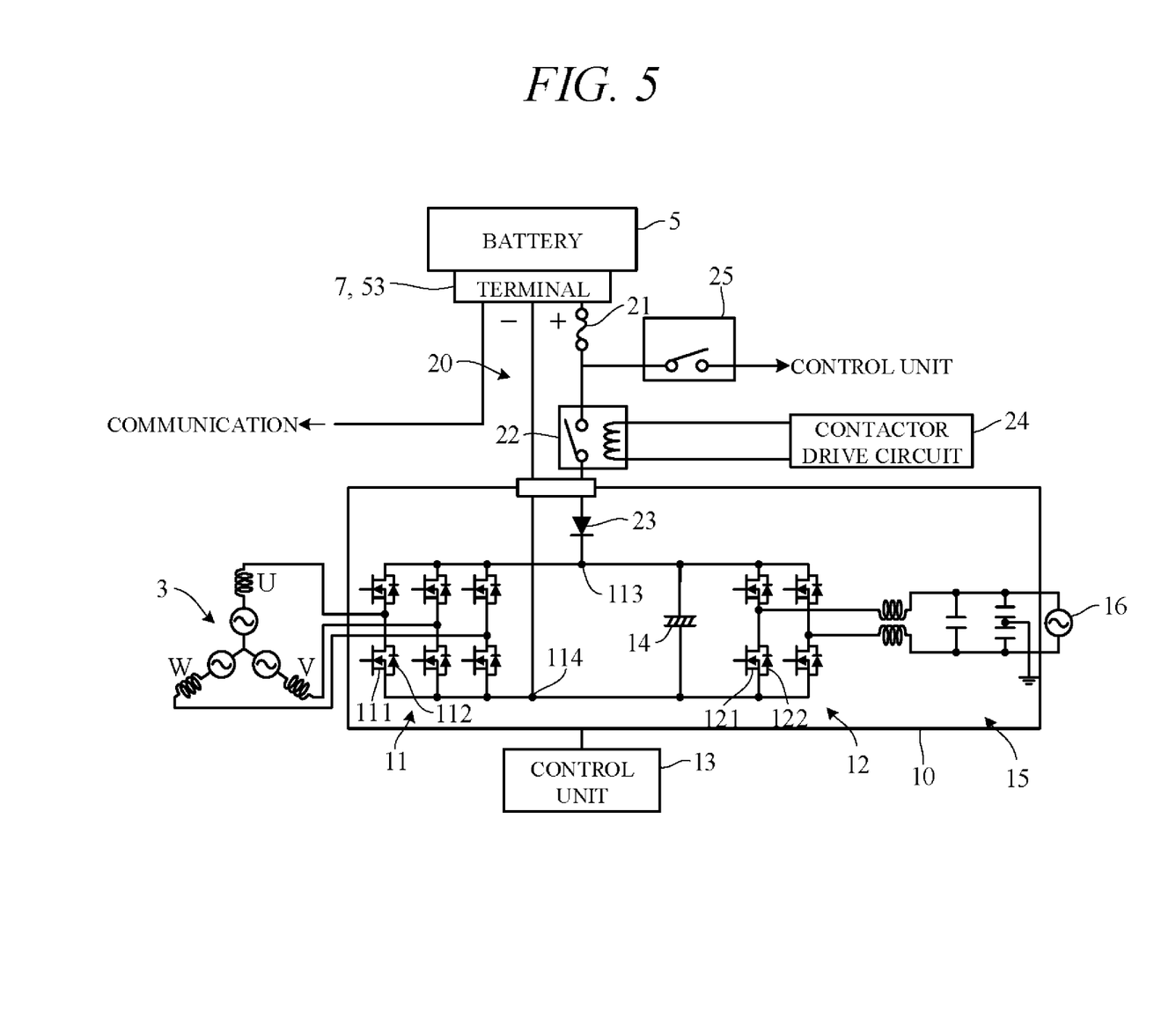
FIG. 5 is a diagram of the main electrical circuit of the engine-generator according to an embodiment of the present invention.

FIG. 5 is a diagram of the main electrical circuit of the engine-generator 100. As shown in FIG. 5, the engine-generator 100 has the inverter unit 10 that converts three-phase AC output by the generator unit 3 to AC power of a predetermined frequency. The inverter unit 10 includes a power conversion circuit 11 for rectifying three-phase AC current output by the generator unit 3, an inverter 12 for converting DC current output from the power conversion circuit 11 to single-phase AC current, and a control unit 13 for controlling the power conversion circuit 11 and the inverter 12. The power conversion circuit 11 can also convert DC current supplied from the battery 5 to three-phase AC current for output to the generator unit 3. The control unit 13 is constituted as a microcomputer, for example.

The power conversion circuit 11 includes three pairs of (a total of six) semiconductor switching elements 111 connected to respective U-phase, V-phase and W-phase windings of the generator unit 3. The switching elements 111 are, for example, configured as MOSFET, IGBT or other transistors, and diodes (e.g., parasitic diodes) 112 are connected in parallel with the switching elements 111. A gate of the switching element 111 is driven by a control signal output from the control unit 13, and ON-OFF switching of the switching elements 111 is controlled by the control unit 13. For example, when the generator unit 3 operates as a generator, the switching elements 111 are turned OFF, so that that three-phase AC is rectified by the diodes 112. The rectified current is smoothed by a capacitor 14 and sent to the inverter 12.

The inverter 12 includes two pairs of (a total of four) semiconductor switching elements 121 configured as an H-bridge circuit. The switching elements 121 are semiconductor switching elements using MOSFET, IGBT or other transistors, and diodes (e.g., parasitic diodes) 122 are connected in parallel with the switching elements 121. A gate of the switching elements 121 is driven by control signals output by the control unit 13, ON-OFF switching of the switching elements 121 is controlled by the control unit 13 so as to convert DC current to single-phase AC current. The single-phase AC current generated by the inverter 12 is sinusoidally modulated through a filter circuit 35 including a reactor and a capacitor and is output to a load 16.

The battery 5 is electrically connected to the inverter unit 10 through a power supply circuit 20. The power supply circuit 20 is provided such that the battery 5 is positioned between the power converter circuit 11 and the capacitor 14 through terminals 7 and 53, i.e., the battery 5 is positioned so as to connect to the power terminal 313 and the power terminal 314 of the power converter circuit 11. More specifically, a positive side terminal of the battery 5 is connected to the positive side power terminal 113 of the power converter circuit 11 through a fuse 21, a contactor 22 and a diode 23, and a negative side terminal thereof is connected to the minus side power terminal 114.

The contactor 22 includes a switch for electrically connecting (ON) and disconnecting (OFF) the battery 5 to and from the inverter unit 10, and its ON-OFF operation is controlled by a contactor drive circuit 24. A battery switch 25 is connected between the fuse 21 and the contactor 22, and power is supplied to the control unit 13 by turning the battery switch 25 ON. This causes the contactor drive circuit 24 to turn the contactor 22 ON. When the battery switch 25 is turned OFF, the contactor drive circuit 24 turns the contactor 22 OFF. In other words, the contactor 22 is turned ON and OFF conjointly with ON-OFF operation of the battery switch 25.

When the engine 2 is to be started by power from the battery 5, the user turns the battery switch 25 ON. This turns the contactor 22 ON, and power of the battery 5 is supplied to the power converter circuit 11. At this time, the control unit 13 determines whether the battery switch 25 is ON, and when the control unit 13 determines the battery switch 25 to be ON, it ON-OFF controls the switching elements 111 of the power converter circuit 11 to convert DC power to AC power. The resulting AC power is supplied to the generator unit 3, so that a revolving magnetic field is produced in a stator winding and a rotor of the generator unit 3 rotates. As a result, a crankshaft 11 is rotated and the engine 2 can be started by cranking. During engine starting, the control unit 13 also controls, inter alia, a sparkplug for igniting an air-fuel mixture in a combustion chamber, a throttle motor for regulating opening angle of a throttle valve provided in an air intake pipe, and an injector for injecting fuel to produce the air-fuel mixture.

When starting of the engine 2 is completed and the battery switch 25 turned OFF, the contactor 22 is turned OFF to cut off supply of power from the battery 5 to the inverter unit 10. After this, the rotor of the generator unit 3 is rotationally driven by the engine 2 and the generator unit 3 generates power. The terminals 7 are connected to a communication line, and internal temperature, charge state and other battery 5 data are transmitted through this communication line to the control unit 13.

The present embodiment can achieve advantages and effects such as the following.

(1) The engine-generator 100 according to the present embodiment includes the general-purpose engine 2, the generator unit 3 that is both drivable by the engine 2 to generate power and operable as a starter motor during engine starting, the case 1 that houses the engine 2 and the generator unit 3, the battery pack 50 (battery 5) that can be removably attached to the case 1, the inverter unit 10 that is connected to the generator unit 3 and the power supply circuit 20 that interconnects the battery 5 attached to the case 1 and the inverter unit 10 and supplies power of the battery 5 through the inverter unit 10 to the generator unit 3 (FIGS. 3 and 5), Owing to this configuration, the battery 5 for supplying power to the generator unit 3 during engine starting need not be built into the engine-generator 100, and as such the configuration can avoid enlargement of the engine-generator 100 and enable the engine-generator 100 to achieve outstanding portability and mobility.

(2) The power supply circuit 20 includes the terminals 7 that are provided on the terminal block 6 and come into contact with the terminals 53 of the battery 5 (FIGS. 3 and 5). The engine-generator 100 further includes the cover 8 that is caused to cover the terminals 7 as the battery 5 is being removed from the case 1 (FIGS. 4A and 4B). Owing to this configuration, the terminals 7 can be covered by the cover 8 and the terminals 7 be well protected when the battery 5 is in a removed state.

(3) The engine-generator 100 further includes the recoil starter 4 that is connected to the output shaft (crankshaft) of the engine 2 and operated by the user to apply torque to the output shaft (FIG. 1). So even when residual charge of the battery is low, or no battery 5 is available, the engine 2 can nevertheless be started, manually using the recoil starter 4.

(4) The case 1 includes the terminal block 6 that supports the battery pack 50 slidably with respect to the case 1 and retains the battery pack 50 in a predetermined position enabling connection with the power supply circuit 20 (FIG. 3). The attachment and removal of the battery pack 50 by sliding operation in this manner makes it easy to attach and remove the battery 5 (with one hand, for example), so that user workload at engine starting is minimized.

(5) The engine-generator 100 includes the battery switch 25 for instructing starting of the engine 2, and the power supply circuit 20 has the contactor 22 that operates conjointly with operation of the battery switch 25 to establish or cut off connection between the battery 5 and inverter unit 10 (FIG. 5). The battery 5 can therefore be suitably removed in an electrically disconnected condition after the engine is started.

Figure 6:
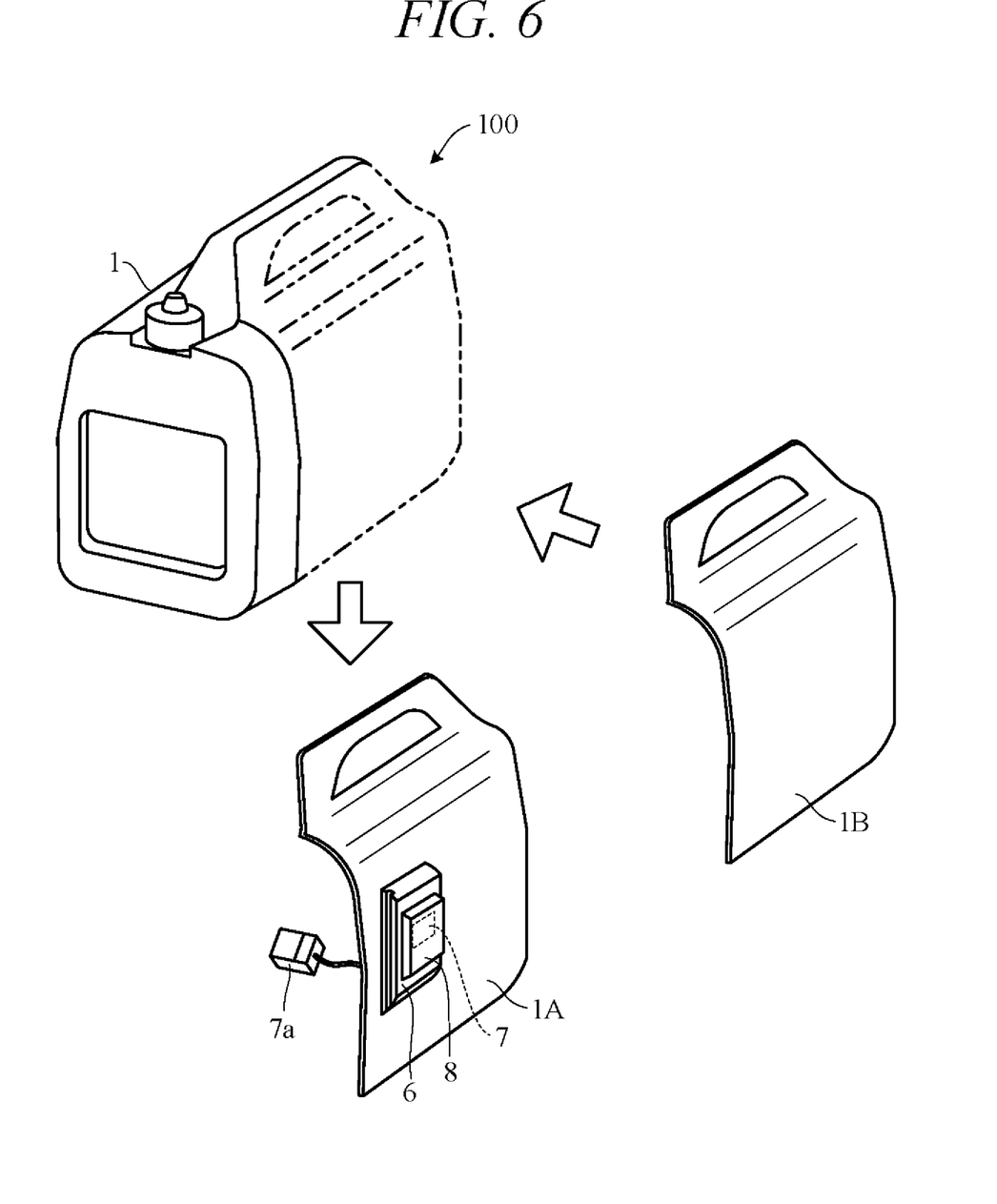
FIG. 6 is a perspective diagram showing a modification of the engine-generator according to an embodiment of the present invention.

Although the terminal block 6 is provided on the case 1 and the battery 5 is removably attached to the terminal block 6 in the aforesaid embodiment, alternatively the terminal block 6 can be provided on a panel constituting part of the case 1 and that panel be made replaceable by another panel not having the terminal block 6. FIG. 6 is a diagram showing an example of such a configuration. In the example of FIG. 6, part of the case 1 is constituted by a detachable panel (first panel 1A) bearing the terminal block 6, a connector 7a electrically connected to the terminals 7 is provided on a rear side of the first panel 1A), and the terminals 7 are connected to the power supply circuit 20 through the connector 7a. The first panel 1A is removably attachable using bolts or the like not shown in the diagram, and the first panel 1A can be replaced by a second panel 1B not having the terminal block 6. This arrangement facilitates specification changing because simply by exchanging panels engine-generator 100 specifications can be easily switched between ones for starting the engine 2 with a starter motor (specifications enabling battery 5 attachment) and ones for starting the engine 2 with the recoil starter 4.

Figure 7:
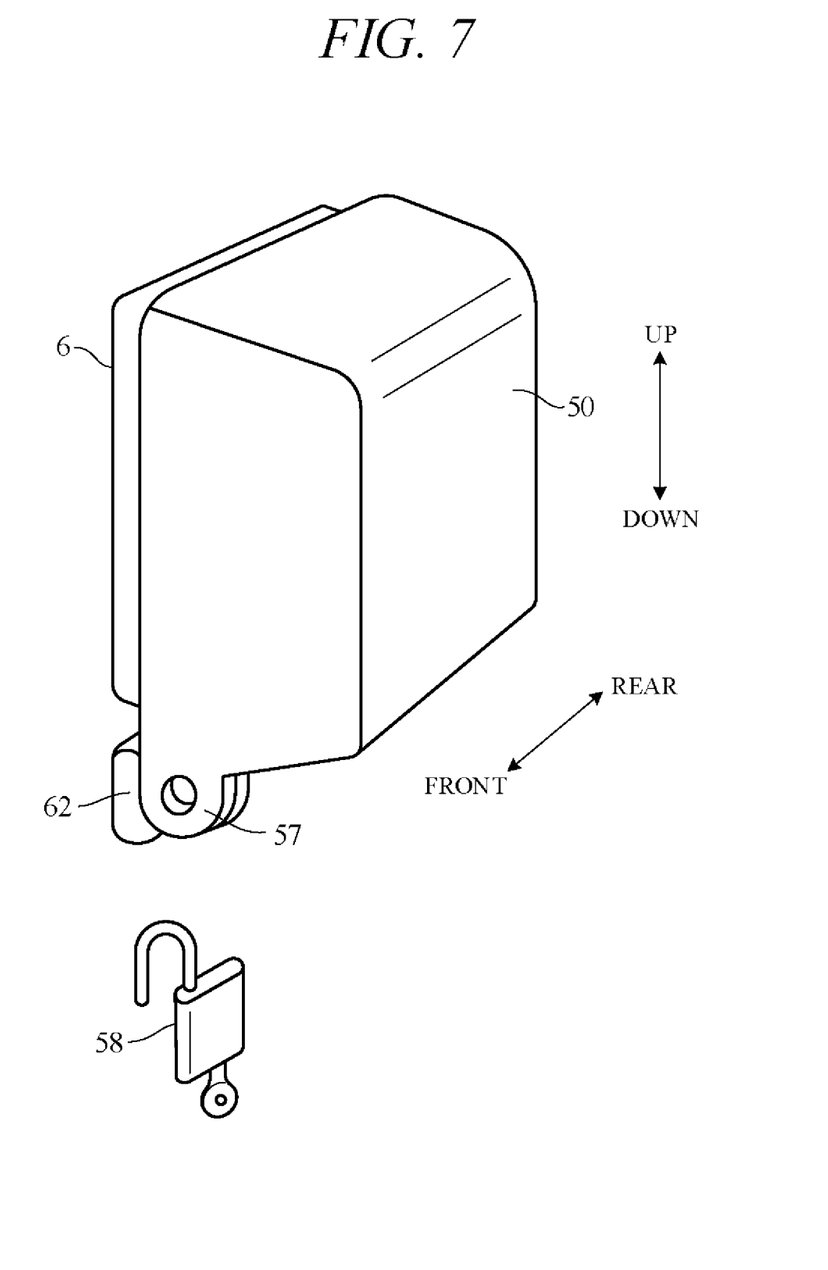
FIG. 7 is a diagram showing an example of a lock mechanism of battery constituting the engine-generator according to an embodiment of the present invention.

Rather than attaching the battery 5 to the case 1 only during engine starting, the battery 5 can instead be left attached to the case 1 also at times other than during engine starting. As an antitheft measure when this mode is adopted, a lock mechanism can be provided for fastening the battery 5 to the case 1. FIG. 7 is a diagram showing an example of such a lock mechanism. In the example of FIG. 7, a bracket 62 is provided under the terminal block 6, and a plate part 57 is projected from the lower end of the battery pack 50 in matching relation to the bracket 62. When the battery pack 50 attached to the terminal block 6, the bracket 62 and the battery pack 50 can be locked together by a lock 58. The lock mechanism is not limited to that described here.

Although not illustrated, a charging circuit can be interposed between the battery 5 and the inverter unit 10 so that the battery 5 can be charged by power from the generator unit 3. In the aforesaid embodiment, the engine-generator 100 is configured to house the engine 2 and the generator unit 3 in the case 1, but a housing of any configuration can be adopted. The terminal block 6 serving as a battery holding member can be of any configuration insofar as it slidably supports the battery 5 and holds the battery 5 at a predetermined position enabling electrical connection with the power supply circuit 20. The sliding direction of the battery 5 need not be vertical but can instead be horizontal, for example. In the aforesaid embodiment, the contactor 22 is turned ON and OFF in linked operation with the battery switch 25 (operating means), but the configuration of the switching means for establishing and cutting off connection between the battery and the inverter unit in linked operation with the operating means is not limited to the aforesaid configuration.

The above embodiment can be combined as desired with one or more of the above modifications. The modifications can also be combined with one another.

In accordance with the present invention, since the battery is provided to be removably attachable to the housing and power of the battery is supplied to the generator unit, the generator unit can be driven by power of the battery to start the engine, and enlargement of the engine-generator can be prevented because the battery need not be incorporated internally.

Above, while the present invention has been described with reference to the preferred embodiments thereof, it will be understood, by those skilled in the art, that various changes and modifications may be made thereto without departing from the scope of the appended claims.

What is claimed is:

1. An engine generator, comprising:
   a general-purpose engine;
   a generator unit configured to be driven by the engine to generate electric power and to be able to operate as an engine starter motor during engine starting;
   a case configured to house the engine and the generator unit;
   a battery pack including a battery and configured to be detachably attached to the case;
   an inverter unit configured to be connected to the generator unit;
   a power supply circuit including a terminal part coming into contact with a terminal of the battery and configured to interconnect the battery included in the battery pack attached to the case and the inverter unit and to supply power of the battery through the inverter unit to the generator unit; and
   a cover supported on a surface of the case in a manner slidable along the surface to cover the terminal part, wherein
   the battery pack includes a projection configured to push an end of the cover along the surface so as to expose the terminal part along with an attachment of the battery pack to the case,
   the cover is supported slidably in a vertical direction, and
   the projection is provided lower than the terminal of the battery so as to abut on an upper face of the cover along with the attachment of the battery pack to the case.

2. The engine generator according to claim 1, wherein the cover is slidably supported along a surface of the case via a spring.

3. The engine generator according to claim 1, further comprising
   a recoil starter configured to be connected to an output shaft of the engine and to be operated by the user to apply torque to the output shaft.

4. The engine generator according to claim 1, wherein the case includes a battery holding member configured to support the battery pack slidably with respect to the case and holds the battery at a predetermined position enabling connection with the power supply circuit.

5. The engine generator according to claim 4, wherein a part of the case is constituted by a first panel configured to include the battery holding member, and the part of the case is replaceably provided at a second panel configured not to include the battery holding member.

6. The engine generator according to claim 4, wherein the battery pack includes a recess configured to slide with respect to the case and to be fitted into the battery holding member.

7. The engine generator according to claim 6, wherein the battery pack includes a latch mechanism configured to fix the battery pack to the case unslidably.

8. The engine generator according to claim 6, further comprising
   a lock mechanism configured to prevent the battery pack from being removed, the battery pack being attached to the case.

9. The engine generator according to claim 1, further comprising
   an operating unit configured to instruct starting of the engine, wherein
   the power supply circuit includes a switching unit configured to operate conjointly with operation of the operating unit to establish or cut off connection between the battery and the inverter unit.

10. The engine generator according to claim 1, further comprising
    a spring biasing the cover upward, wherein
    the cover is slid downward against a biasing force of the spring with the attachment of the battery pack to the case.

11. The engine generator according to claim 1, wherein the terminal part includes a contact face extending parallel to the surface of the case and contacting the terminal of the battery.

* * * * *